United States Patent [19]

Onoe et al.

[11] 4,188,962
[45] Feb. 19, 1980

[54] MONEY DISPENSATION CONTROL DEVICE

[75] Inventors: Katsuhiko Onoe; Toshihisa Kosaka, both of Himeji, Japan

[73] Assignee: Glory Kogyo Kabushiki Kaisha, Himeji, Japan

[21] Appl. No.: 926,744

[22] Filed: Jul. 21, 1978

Related U.S. Application Data

[63] Continuation-in-part of Ser. No. 759,360, Jan. 14, 1977, abandoned.

[51] Int. Cl.² ............................................. G07D 1/00
[52] U.S. Cl. .................................................... 133/4 R
[58] Field of Search .............. 133/1 R, 4 A, 4 R, 8 R; 194/DIG. 26, 4; 271/263; 235/92 SB

[56] References Cited

U.S. PATENT DOCUMENTS

| | | | |
|---|---|---|---|
| 3,123,082 | 3/1964 | Call et al. | 133/4 R |
| 3,949,200 | 4/1976 | Shigemori et al. | 194/DIG. 26 |
| 3,958,583 | 5/1976 | Shigemori et al. | 133/4 R |
| 3,965,913 | 6/1976 | Tokura et al. | 133/8 R |

Primary Examiner—Stanley H. Tollberg
Attorney, Agent, or Firm—Wenderoth, Lind & Ponack

[57] ABSTRACT

In a money dispensation control system for a money dispenser which dispenses money having a plurality of denominations, money is dispensed separately in a priority order predetermined according to the denominations, and when the amount of money dispensed in any one of the denominations is less than the amount of money to be dispensed, money of this denomination is dispensed until the shortage is corrected.

2 Claims, 3 Drawing Figures

4,188,962

MONEY DISPENSATION CONTROL DEVICE

This application is a continuation-in-part of Ser. No. 759,360, filed Jan. 14, 1977, now abandoned.

BACKGROUND OF THE INVENTION

This invention relates to money dispensation control systems.

High reliability and processing speed are especially essential for a money dispensing machine which operates to dispense money in monetary denominations specified by a customer or operator up to the amount of money specified by him. In order to improve the reliability, it is necessary to provide a variety of detecting means in the money conveying section of the money dispensing machine; that is, in the case of a bank note dispensing machine it is required to provide a note width detecting means, a note thickness detecting means, and a note conveying condition detecting means, for instance, and if necessary, a pattern reading means and a magnetic detecting means. Therefore, the money conveying path is necessarily lengthened by the provision of various detecting means such as described above. Furthermore, it is necessary to additionally provide a rejected money receiving means which receives the money whenever false or abnormal money is detected by the detecting means described above. If these detecting means and the rejected money receiving means are intended to accurately and positively operate, time delays due to the operation of these means and the waiting time spent for the concerned operations occurs necessarily. This is one of the factors which reduce the number of pieces of money processed per unit time.

SUMMARY OF THE INVENTION

Accordingly, an object of this invention is to overcome the above-described difficulties accompanying a conventional money dispensing machine.

More specifically, an object of the invention is to provide a money dispensation control system for a money dispensing machine with a variety of note detecting means and a rejected money receiving means, by which the dispensation of money can be achieved at high speed with high accuracy.

The foregoing object and other objects of this invention have been achieved by the provision of a money dispensation control system for a money dispensing machine which dispenses money having a plurality of denominations through a money conveying mechanism out of a money container section. Money is dispensed having the denominations specified by an operator out of said plurality of denominations in a priority order predetermined according to said plurality of denominations, through said money conveying mechanism to the monetary values specified by the operator for the respective specified denominations. When a shortage occurs in the dispensation of money in any one of the specified denominations, money of this denomination is additionally dispensed until the shortage is corrected. Thereafter money of the next denomination in the priority order among the specified denominations is dispensed, or the additional money dispensation is carried out after money has been dispensed in all of the specified denominations.

The nature, principle and utility of this invention will become more apparent from the following detailed description and the appended claims when read in conjunction with the accompanying drawings.

DETAILED DESCRIPTION OF THE INVENTION

Figure 1:
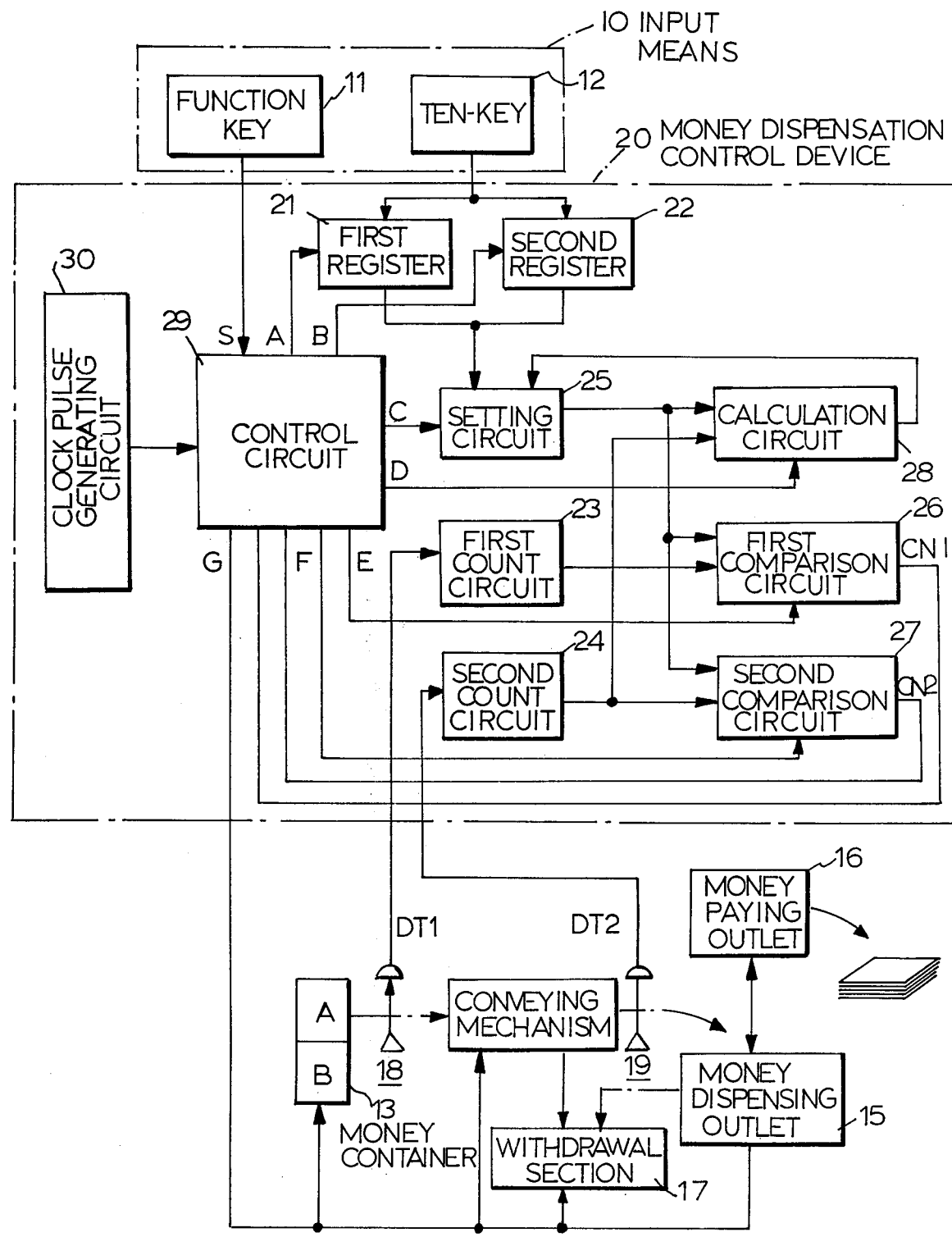
FIG. 1 is a block diagram illustrating a money dispensation control device practicing the money dispensation control system according to this invention.

Referring to FIG. 1, the money dispensation control system comprising an input means 10 comprising a ten-key keyboard 12 and a function key 11 which are operated by the user; a money container 13 containing, for example, bank notes A and B different in denomination; a conveying mechanism 14 for receiving notes from the money container 13 and conveying them to a money dispensing outlet 15; a money paying outlet 16 for paying or issuing the dispensed notes to the user; a withdrawal section 17 which withdraws the note when an abnormal or false bank note is detected as was described before or when a withdrawal instruction is issued; a first note passage detecting device 18 for detecting a bank note while it passes from the money container 13 to the conveying mechanism 14, the detecting means 18 comprising a photoelectric device for instance; a second note passage detecting device 19 for detecting a bank note while it passes from the conveying mechanism 14 to the money dispensing outlet 15, the detecting means 19 comprising a photoelectric device, for instance; and a dispensation control means 20 for controlling the above-described money dispensation and payment according to instructions from the input means 10.

The dispensation control means 20 comprises in part: a first register 21 and a second register 22 which store data representing the respective monetary denominations and amounts of money specified by the input means 10; a first count circuit 23 which receives the detection signal DT1 from the first note passage detecting device 18 to count the number of notes passing therethrough; and a second count circuit 24 which receives the detection signal DT2 from the second note passage detecting device 19 to count the number of notes passing therethrough. The data stored in the first register 21 and the second register 22 are transferred into a setting circuit 25. The data of the first count circuit 23 and the data of the setting circuit 25 are compared in a first comparison circuit 26. Upon coincidence, the first comparison circuit generates a coincidence signal CN1. Similarly, the data of the second count circuit 24 and the data of the setting circuit 25 are compared in a second comparison circuit 27. Upon coincidence, the second comparison circuit 27 generates a coincidence signal CN2.

The calculation circuit 28 calculates the difference between the data of the setting circuit 25 and the data of the second count circuit 24, and stores the difference value in the setting circuit 25. A control circuit 29 generates control signals A, B, C, D, E, F and G in synchronization with a pulse signal from a clock pulse generating circuit 30 to control the above-described circuits.

In operation, when the monetary denominations and respective amounts of money to be dispensed are determined by the input means 10, the control circuit 29 receives denomination signals S from the function key 11, and the data representative of the money amounts from the ten-key keyboard 12 are stored in the first and second registers 21 and 22 with the aid of the control signals A and B, respectively.

Upon issuance of a start instruction, the money amount data of the first register 21 is first stored in the setting circuit 25 in accordance with a predetermined priority order with the aid of the control signals A and B. In this case, the note A takes precedence over the note B. Accordingly, a note A is delivered from the money container 13 onto the conveying mechanism 14 by a control signal G generated by the control circuit 29 in response to the denomination signal from the function key 11, and the note A is further delivered from the conveying mechanism 14 into the money dispensing outlet 15.

The notes thus delivered are detected by the first note passage detecting device 18 while they pass from the money container 13 to the conveying device 14, and the total number of notes is counted by the first count circuit 23 from the detection signals DT1 applied thereto. When the first comparison circuit 26 with the aid of the control signal E detects that the total number of notes coincides with the value set in the setting circuit 25, a coincidence signal CN1 is generated by the first comparison circuit 26, whereupon the delivery of notes A to the conveying mechanism is temporarily suspended.

On the other hand, the notes A being dispensed into the money dispensing outlet 15 from the conveying mechanism 14 are detected by the second note passage detecting device 19. The total number of notes is counted by the second count circuit 24 from the detection signals DT2 applied thereto. When the second comparison circuit 27 with the aid of the control signal F detects that the total number of notes dispensed into the money dispensing outlet coincides with the set value in the setting circuit 25, the second comparison circuit 27 generates a coincidence signal CN2, and the delivery of notes A is stopped by the control circuit 29. Thus, the notes A have been dispensed into the money dispensing outlet 15 from the money container up to the required money amount.

However, when the coincidence signal CN1 is generated temporarily suspending the note delivering operation, the total number of notes dispensed into the money dispensing outlet 15 is not always equal to the value set in the setting circuit 25. For instance, in the case where a note or notes have been withdrawn from the conveying mechanism to the withdrawal section 17 because they are abnormal notes, the total number of the notes dispensed into the money dispensing outlet is less than the number of notes delivered to the conveying mechanism from the money container. Thus, even in the case where the coincidence signal CN1 has been produced, the coincidence signal CN2 is not always produced. In such a case, the control circuit 29 causes the calculation circuit 28 to calculate the difference between the value set in the setting circuit 25 and the count value of the second count circuit 24, with the aid of the control signal D. The control circuit 29 resets the first count circuit 23, the second count circuit 24 and the setting circuit 25, and stores the difference values thus calculated in the setting circuit 25. As a result, the coincidence signal CN1 is cancelled, and the operations of taking, delivering and dispensing of notes A are carried out again with the aid of the control signals from the control circuit 29, in a manner similar to the above-described case. These operations are repeatedly carried out (if necessary) until both the coincidence signals CN1 and CN2 are newly produced. Upon production of the coincidence signals CN1 and CN2, dispensation of notes B next in the priority order is carried out.

In this case, the money amount data of notes B stored in the second register 22 is stored as new data in the setting circuit 25. Then, in a manner similar to the dispensation of notes A, notes B are dispensed.

The above-described embodiment of this invention is illustrated in random logic; however, it may be embodied by a microprocessor.

Figure 2:
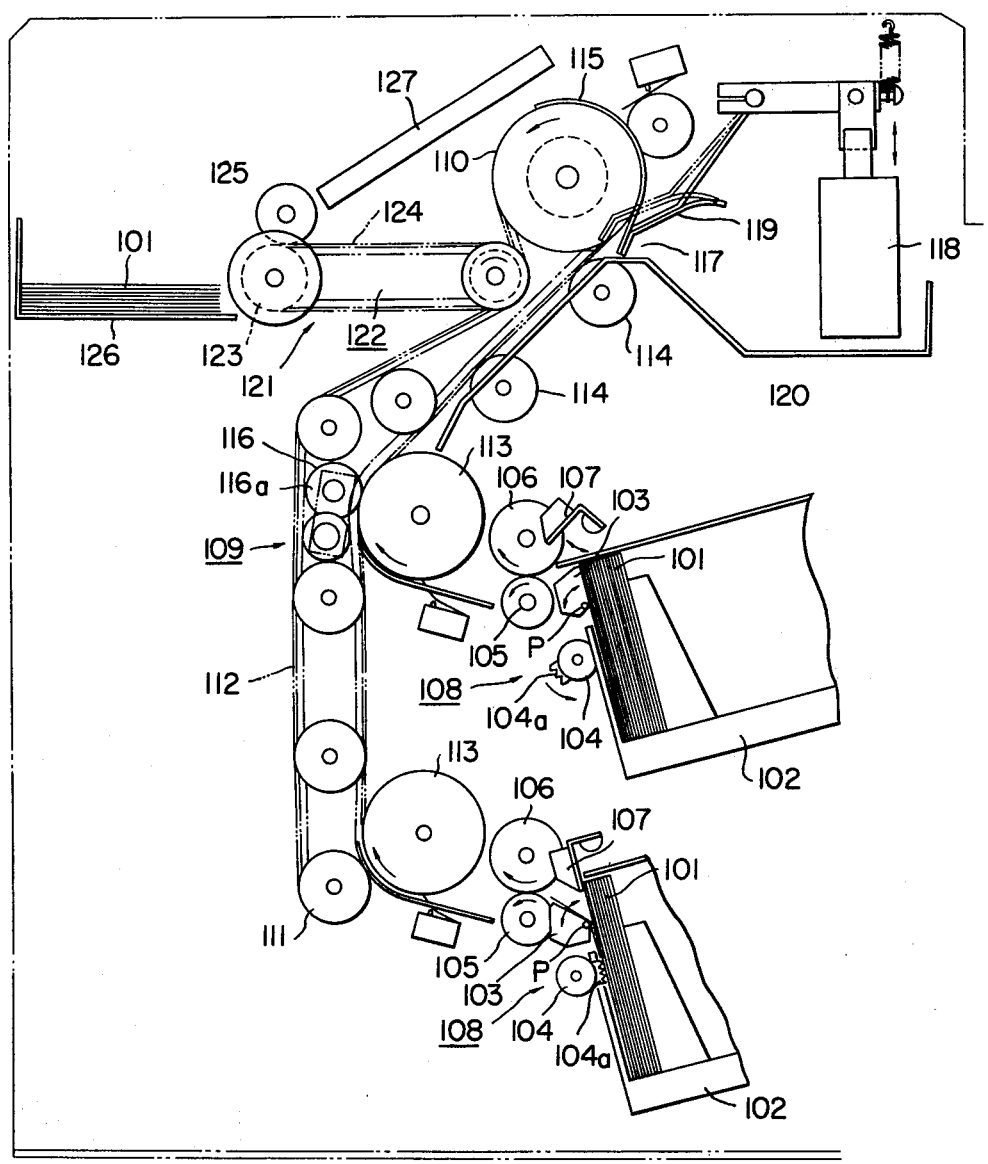
FIG. 2 is an explanatory diagram showing essential parts of the money dispensing machine which is controlled by the control device shown in FIG. 1.

Essential parts of the money dispensing machine which are controlled by the money dispensation control device illustrated in FIG. 1 are shown in FIG. 2. In the following description, reference numerals in FIG. 1 corresponding to those in FIG. 2 are parenthesized, as conducive of a full understanding of the invention.

The money dispensing machine comprises two money containers 102 (13) arranged vertically and containing a number of notes 101. A note feeding mechanism 108 is provided for each money container 102. Each note feeding mechanism 108 is in the vicinity of the outlet of the respective money container, and it has a suction head 103 connected to a suction source (such as a vacuum pump) so as to swing around the fulcrum P in the direction of the arrow, a note kicking roller 103 with a note kicking part 104a for kicking out a note which is separated from the notes in the money container 102 (13) by means of the suction head 103, a pair of feeding rollers 105 and 106 for sandwiching and transferring the note which has been pushed upward by the note kicking roller 104, and a note retaining member 107 which serves to retain the stack of notes when notes are not taken out of the money container.

A conveying mechanism 109 (14) is provided in succession with the note feeding mechanism 108. The conveying mechanism 109 operates to convey to the upper part of the money dispensing machine a note which has been taken out of the money container by means of the note feeding mechanism 108. The mechanism 109 is provided with an endless conveyer belt 112 laid on pulleys 110 and 111, and conveyer rollers 113 and 114 which are rotated by abutting against the conveyer belt 112. The note is forwarded by being sandwiched between the belt 112 and the rollers 113 and 114.

A curved guide member 115 is provided along the upper half of the circumference of the above-described pulley 110, for guiding the note 101 delivered thereto. In the vicinity of the entrance of this guide member is provided a two-sheet detecting mechanism 116 which serves to detect two notes stacked one on another (hereinafter referred to as "two stacked notes" when applicable) which are delivered from the container. A note rejecting mechanism 117 is provided at the rear stage of the two-sheet detecting mechanism 116, for rejecting two stacked notes.

The two-sheet detecting mechanism 116 may be a means which comprises a photoelectric tube and a light receiving element for detecting two stacked notes with the aid of the quantity of light passing through the notes. It may be a means in which, as is shown in FIG. 2, a detecting roller 116a is kept abutted against one of the conveying rollers 113, so that whenever a stack of two notes passes between the two rollers, it is detected from the displacement of the detecting roller 116a.

The note rejection mechanism 117 is made up of a solenoid 118 which is activated by a detection signal produced by the two-sheet detecting mechanism 116, and a route switching member 119 which, upon operation of the solenoid 118, switches the note conveying route in the conveying mechanism 109 (14) to a rejected note receiving section 120 (17) so that the two stacked notes are received and stored therein.

The money dispensing machine further comprises a note receiving mechanism 121 having a low speed conveyance device 122. This low speed conveyance device 122 comprises a conveyer belt arranged horizontally the speed of which is lower than that of the conveyer belt in the conveying mechanism 109 (14). A belt 124 is laid on a pulley 123 provided in the front part of the device 122. A driven roller 125 is maintained abutted against the belt 124, so that a note 101 is allowed to pass between the roller 125 and the belt 124 thereby to be delivered into a note receiving section 126. The low speed conveyance device 122 is driven through an intermediate pulley, for instance, to cause its speed to be lower than the speed of the conveying mechanism 109 (14). In FIG. 2, reference numeral 127 is intended to designate a part adapted to prevent notes 101 from flying away.

Upon issue of a dispensation instruction, a necessary number of notes are taken out of the money container 102 (14) and each note is inserted between the belt 112 and the conveying roller 113 and conveyed upward. If the notes being conveyed are not stacked one on another or if they are conveyed one after another, each of the notes passes through the two-sheet detecting mechanism 116, and enters between the pulley 110 and the guide member 115, whereby it is dispensed onto the low speed conveyance device 122.

Figure 3:
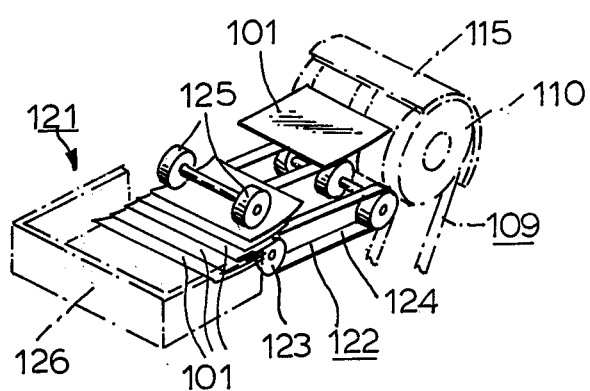
FIG. 3 is also an explanatory diagram for a description of a low speed conveyance device in the money control dispensation device.

The inertia of the note 101 thus dispensed is reduced when it strikes the circumference of the driven roller or the belt 124 in the low speed conveyance device 122. Thus, the note 101 is gently placed on the belt 124. Thus, all of the notes are gently placed on the belt 124. Therefore, the notes, as shown in FIG. 3, are piled and forwarded into the note receiving section 126 by passing between the belt 124 and the driven roller 125. Accordingly, the notes 101 are gently piled one on another, thus forming a neat stack of notes in the note receiving section.

When two stacked notes are conveyed from the money container, they are detected by the two-sheet detecting mechanism 116, whereupon a detection signal is produced to excite the selenoid 118. As a result, the route switching member 119 is moved to the position indicated by the broken lines so that the two stacked notes are directed toward the rejected note receiving section 120 (17). When the two stacked notes are taken into the rejected note receiving section 120 (17), the solenoid 118 is deenergized, and the route switching member 119 is returned to its original position indicated by the solid lines. Therefore, the following notes (which are not stacked) are forwarded to the note receiving mechanism 121.

As is apparent from the above description, amounts of money in denominations specified by an operator can be positively dispensed, and necessary numbers of pieces of money in the specified denominations are taken out of the respective money containers in a predetermined priority order of denominations up to the respective amounts of money. In the dispensation of money in each denomination, if the total amount of money dispensed is less than the amount of money specified, the dispensation is carried out again until the total amount of money actually dispensed reaches the specified amount of money. Therefore, the dispensation of money can be achieved more positively and quickly.

The present invention has been described with reference to the case where after the dispensation of money of one denomination, the shortage in the dispensation, if any, is complemented by additionally dispensing a necessary number of pieces of money in that denomination. However, this method may be changed so that after the dispensation of money in all of the denominations specified by the customer, the shortage in the dispensation of money in any denomination is complemented by additionally dispensing the necessary number of pieces of money in that denomination. In this case, the shortage data calculated by the calculation circuit 28 is temporarily transferred to and stored in the first register 21 or the second register 22 according to the denomination. In dispensing money as was described above, the shortage data stored in the denomination register is applied, as the set value, to the setting circuit 25. In this method also, effects or results as described above can be obtained.

Furthermore, this invention has been described with reference to the case where bank notes are dispensed in two difference denominations; however, it is particularly understood that the invention is not limited to only two different denominations. That is, the number of monetary denominations is optional. It is understood that by using appropriate coin conveying mechanisms the technical concept of the invention can also be applied to the dispensation of coins. In addition, the count-comparison circuit may comprise a counter and a comparator, or a preset-down-counter.

We claim:

1. In a money dispensing machine operating to dispense money in a plurality of monetary denominations to a required total money amount through a money conveying mechanism out of a money container section, a money dispensation control device comprising:
    (a) a plurality of registers for storing data representative of amounts in the respective monetary denominations which are selectively specified to be dispensed;
    (b) a first money passage detecting device for detecting pieces of money which are delivered to the money conveying mechanism from the money container section and for generating detection signals;
    (c) a second money passage detecting device for detecting pieces of money which are dispensed into the money dispensing outlet from the money conveying mechanism and for generating detection signals;
    (d) a first count circuit connected to said first money passage detecting device for counting the detection signals generated by said first money passage detecting device;
    (e) a second count circuit connected to said second money passage detecting device for counting the detection signals generated by said second money passage detecting device;
    (f) a setting circuit connected to said plurality of registers for temporarily storing data representative of the amount stored in each of said plurality of registers;

(g) a first comparison circuit connected to said setting circuit and said first count circuit for comparing the data stored in said setting circuit with the count value of said first count circuit, and for generating a first coincidence signal upon coincidence;

(h) a second comparison circuit connected to said setting circuit and said second count circuit for comparing the data stored in said setting circuit with the count value of said second count circuit, and for generating a second coincidence signal upon coincidence;

(i) a calculation circuit connected to said setting circuit and said second count circuit for calculating the difference value between the data stored in said setting circuit and the count value of said second count circuit; and (j) a control circuit connected to said plurality of registers, said setting circuit, said first and second comparison circuits and said calculation circuit for storing in turn according to a predetermined priority order with respect to the plurality of monetary denominations the data representative of the selected amounts of the respective monetary denominations stored in said plurality of registers in said setting circuit, for initiating the money dispensing operation, for suspending the monetary dispensing operation upon generation of said first coincidence signal, for storing the difference value of said calculation circuit when said first coincidence signal is generated and said second coincidence signal is not generated in the respective register of said plurality of registers according to the monetary denomination, for storing the data representative of the selected amount of the next monetary denomination in said predetermined priority order stored in the respective one of said plurality of registers in said setting circuit, and after dispensing money in each of the monetary denomination for storing in said setting circuit the difference value of said calculation circuit stored in said respective register for initiating an additional monetary dispensing operation of the corresponding monetary denomination, whereby a shortage in any monetary dispensing operation is corrected after dispensing money in each of said plurality of monetary denominations.

2. In a money dispensing machine operating to dispense money in a plurality of monetary denominations selectively specified to a required total money amount through a money conveying mechanism out of a money container section, a money dispensation control device comprising:

(a) a plurality of registers for storing data representative of amounts in the respective monetary denominations which are selectively specified;

(b) a first money passage detecting device for detecting pieces of money which are delivered to the money conveying mechanism from the money container section and for generating detection signals;

(c) a second money passage detecting device for detecting pieces of money which are dispensed into the money dispensing outlet from the money conveying mechanism and for generating detecting signals;

(d) a first count circuit connected to said first money passage detecting device for counting the detection signals generated by said first money passage detecting device;

(e) a second count circuit connected to said second money passage detecting device for counting the detection signals generated by said second money passage detecting device;

(f) a setting circuit for temporarily storing data representative of the amount stored in each of said plurality of registers;

(g) a first comparison circuit connected to said setting circuit and said first count circuit for comparing the data stored in said setting circuit with the count value of said first count circuit, and for generating a first coincidence signal upon coincidence;

(h) a second comparison circuit connected to said setting circuit and said second count circuit for comparing the data stored in said setting circuit with the count value of said second count circuit, and for generating a second coincidence signal upon coincidence;

(i) a calculation circuit connected to said setting circuit and said second count circuit for calculating the difference value between the data stored in said setting circuit and the count value of said second count circuit; and (j) a control circuit connected to said plurality of registers, said setting circuit, said first and second comparison circuits and said calculation circuit for storing in turn according to a predetermined priority order with respect to the plurality of monetary denominations the data representative of the selected amounts of the respective monetary denominations stored in said plurality of registers in said setting circuit, for initiating the monetary dispensing operation, for suspending the monetary dispensing operation upon generation of said first coincidence signal, for storing the difference value of said calculation circuit in said setting circuit and initiating an additional monetary dispensing operation in the respective monetary denomination when said first coincidence signal is generated and said second coincidence signal is not generated, and for storing the data representative of the selected amount of the next monetary denomination in said predetermined priority order stored in the respective one of said plurality of registers in said setting circuit when both said first and second coincidence signals are generated, whereby a shortage in any monetary dispensing operation is corrected before dispensing money in the next monetary denomination in said predetermined priority order.

* * * * *